Figure 1:
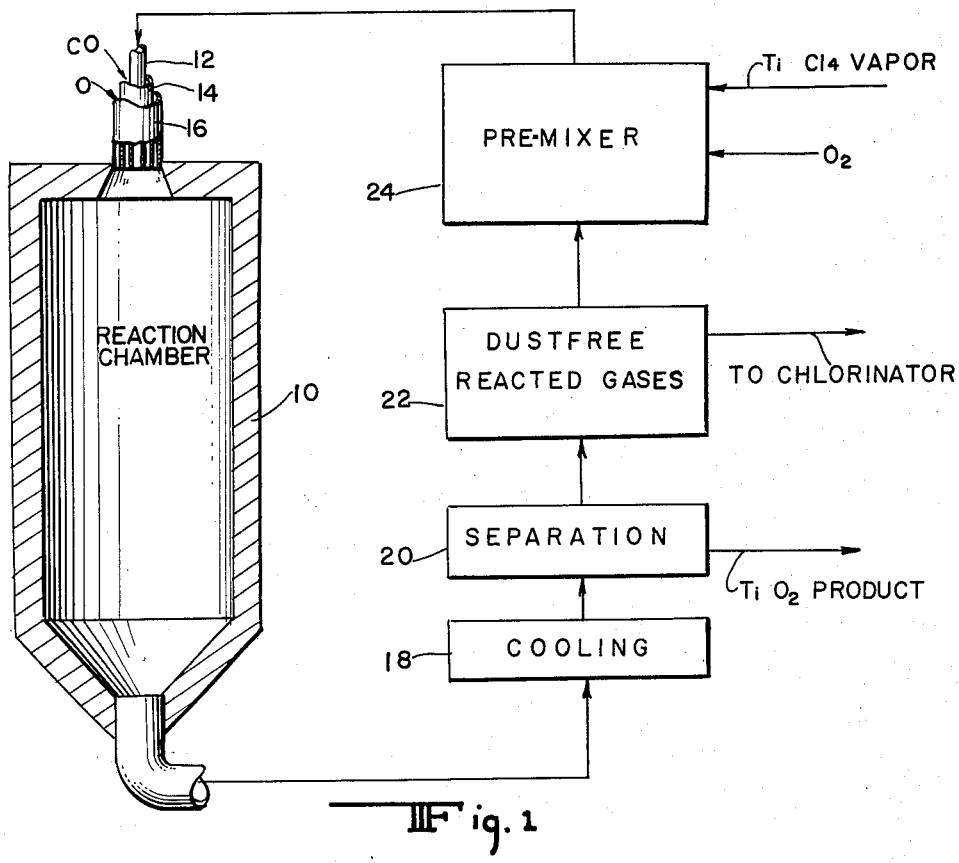

INVENTORS
ROBERT J. MAS
MAURICE G. FIGUET
BY
Albert C. Johnston
ATTORNEYS

:::
United States Patent Office 3,120,427
Patented Feb. 4, 1964

3,120,427
PREPARATION OF TITANIUM DIOXIDE
Robert J. Mas, Thann, and Maurice G. Figuet, Vieux-Thann, France, assignors to Fabriques de Produits Chimiques de Thann et de Mulhouse, Thann, France, a corporation of France
Filed Nov. 1, 1960, Ser. No. 66,481
6 Claims. (Cl. 23—202)

The present invention relates to a process for the preparation of titanium dioxide by the reaction of oxygen with vaporized titanium tetrachloride.

It is well known that, provided the temperature is high enough, this reaction takes place actively, is exothermic, produces titanium dioxide and chlorine, is practically quantitative, and may produce a pigment of excellent quality.

Several ways of carrying out the reaction have been proposed heretofore.

According to one technique, vaporized $TiCl_4$, sometimes diluted with an inert gas, and oxygen containing gas are preheated separately and brought into contact at a suitable reaction temperature. According to another technique, vaporized $TiCl_4$ mixed with oxygen or oxygen containing gas is brought to the temperature of reaction by passing the mixture into a flame produced by the combustion of a separate stream of a combustible gas such as carbon monoxide with a separate stream of oxygen containing gas.

In all the known processes, it has been found advantageous, for enhancement of the quality of the product obtained, to effect the reaction in a medium diluted with a non-reacting gas. It is known that dilution of the $TiCl_4$ by an inert gas modifies the size of the particles of the product obtained. Such dilution consequently, has been regarded as an essential factor for controlling the particle size in the most suitable manner. The greater the dilution of the gases reacting in the reaction zone, the finer are the $TiO_2$ particles obtained. In certain cases, it is possible to produce particles finer than the size that is optimum for a conventional pigment.

The use of the known processes, however, is attended by important practical drawbacks.

When either oxygen or nitrogen in a carefully pre-dried state is used as a dilution gas, the chlorine obtained by the reaction is diluted correspondingly. This is seriously disadvantageous to the recovery of the chlorine content of the reacted gases and also to the reuse of the chlorine, such as by using the reacted gases for the chlorination of titaniferous ore or other raw titaniferous material.

On the other hand, when chlorine is used as a dilution gas to avoid dilution of the chlorine content of the re-acted gases, those gases contain more chlorine than is necessary for the chlorination of the same amount of $TiO_2$ contained in the ore or raw material. It is then necessary to eliminate the excess chlorine. This may be done, for instance, by adding to the ores to be chlorinated substances which, in turn, will produce chlorides other than the desired $TiCl_4$; but then the removal of the other chlorides is unavoidable. Thus a process for making use of chlorine as a dilution gas either results in an extra use of expensive chlorine or requires expensive steps for the recovery or reuse of the excess chlorine content of the reacted gases.

The object of the present invention is to provide improvements of the known processes which eliminate those drawbacks by enabling the dilution of the gases reacting together to produce the $TiO_2$ to be readily controlled as desired for control of the particle size of the $TiO_2$ product and at the same time rendering the concentration of chlorine in the reacted gases independent of the extent of dilution maintained in the reaction zone.

According to the invention, the gases reacting to produce the $TiO_2$ may be as diluted as may be desired, without dilution of the chlorine obtained and without increasing the amount of chlorine present in the process cycle. Alternatively, an unusually high concentration of chlorine may be maintained in the reacted gases while the dilution of the $TiCl_4$ in the reacting gases is kept as great as may be needed for the production of $TiO_2$ of the desired particle size.

We have discovered that the object and the advantages herein mentioned can be achieved by diluting at least one of the gases which are to be reacted together to produce the $TiO_2$ with a portion of the gaseous reaction products, herein referred to as the reacted gases, previously produced by the $TiCl_4$ oxidation reaction. In a continuous process making use of a desired amount of the reacted gases for such dilution, the amount of the reacted gases remaining unused for dilution contains an amount of chlorine substantially equal to that contained in the $TiCl_4$ continuously entering the reaction or oxidation chamber.

The gases present in the chamber in consequence of the oxidation reaction are chiefly chlorine and some oxygen, together with, depending upon particulars of the process used, nitrogen, carbon dioxide and possibly some hydrochloric acid.

These gases after leaving the reaction chamber, and usually after having been cooled, are freed by any suitable means of practically all the titanium dioxide which they hold in suspension. According to the invention, a portion of them is then recycled and introduced into the reaction chamber in such manner that it will be mixed with at least one of the gases which are to be reacted together to produce the $TiO_2$, herein referred to as the reactant gases, before those gases take part in the oxidation reaction. For this purpose, for example, the recycled portion of the reacted gases is introduced in admixture with the vaporized $TiCl_4$ or with an inflowing stream of oxygen containing gas; or it may be introduced through a conduit separate from those which conduct the reactant gases into the chamber.

In the case of a process using $TiCl_4$ and oxygen separately preheated to about the temperature of reaction and introduced through separate conduits, the reacted gases used for dilution according to the invention may be introduced either mixed with the $TiCl_4$ through the conduit provided for it, or mixed with the oxygen containing gas through the conduit provided for such gas; or they may be introduced through a separate conduit arranged between the conduits provided for the reactant gases. When such a separate conduit is used according to the invention, it preferably is arranged as an annular pipe surrounding one of the other conduits.

In a process of the type in which the reactant gases are preheated close to the reaction temperature, the reintroduction of a portion of the reacted gases through a separate conduit or in admixture with the oxygen containing gas is preferable to re-introduction of the same in admixture with the $TiCl_4$, as the former avoids any risk of initiating the reaction of the $TiCl_4$ with oxygen in the preheating equipment.

The invention also applies as well with important advantages to the type of process in which the $TiCl_4$ is heated and reacted with oxygen by passing a gaseous reaction mixture containing these reactants into a flame produced by the combustion of a gas such as carbon monoxide with an oxygen containing gas. In this case, there is no impediment to premixing the $TiCl_4$ vapors with the reacted gases used for the dilution, since the $TiCl_4$ is not preheated to a high temperature before being introduced into the reaction chamber.

Depending upon the extent of dilution of the $TiCl_4$ vapors desired in the reaction zone, the fraction of the reacted gases recycled according to the invention may be varied within wide limits. It usually will be selected at an amount of between .2 and 2 kg. per kg. of vaporized $TiCl_4$, and preferably the amount is between .25 and .5 kg. of recycled reacted gases per kg. of vaporized $TiCl_4$.

During the period of initiating the continuous production of $TiO_2$ according to the invention, the fraction of the reacted gases recycled for the dilution of the reactant gases in the reaction zone may be greater in amount than that specified above, until the desired conditions of continuous operation are established. In the course of establishing the desired conditions and at other times when desired, other diluting gases, for example, nitrogen or oxygen containing gas, may be used in connection with the recycled reacted gases.

According to the invention, the dilution of the $TiCl_4$ and the final concentration of chlorine in the reacted gases become, within large limits, independent of each other and may be controlled at will. By virtue of this fact, the invention gives a remarkable flexibility to operations of the $TiO_2$ production process.

The ability to select the desired extent of dilution in the reaction zone and to keep the dilution constant without reduction of the final concentration of chlorine in the reacted gases makes it possible economically to control and vary the particle sizes of the $TiO_2$ product according to the desired end use of the product. For instance, higher degrees of dilution result in products more suitable for use as fillers, such as in rubber, while lower degrees of dilution give products more suitable for use as color pigment. Adjustment of the dilution to even smaller values result in products suitable for use in vitreous enamels.

The ability to regulate the final concentration of chlorine makes it possible to hold the final chlorine concentration at a value well suited for the desired use of that portion of the reacted gases which is not recycled, such as for the chlorination of titaniferous ore or other titaniferous raw material in the production of $TiCl_4$.

The invention will be further understood through consideration of the following illustrative examples, which make reference to the accompanying schematic drawing in which:

FIG. 1 is a diagrammatic view of a reaction chamber of a type suitable for reacting a mixture of vaporized $TiCl_4$ and oxygen within an auxiliary flame. In this figure, the reaction chamber 10 is provided with an assembly of at least three intake conduits 12, 14 and 16 having concentric orifices for supplying gases into the reaction zone. In accordance with U.S. Patent No. 2,823,982, a reaction mixture containing vaporized $TiCl_4$ and oxygen is supplied through central conduit 12; carbon monoxide is supplied through conduit 14; and oxygen to maintain an annular flame of the carbon monoxide is supplied through conduit 16.

The products of the reaction flow from chamber 10 through cooling apparatus 18 and separation apparatus 20 for the recovery of the $TiO_2$ product and the separate recovery of dustfree reacted gases. The reacted gases are then passed from collection chamber 22 in part to a premixer 24 for admixture with vaporized $TiCl_4$ and oxygen, forming a diluted reaction mixture supplied continuously to the central intake conduit 12. The remainder of the reacted gases is passed to a chlorinator for use in the chlorination of titaniferous raw materials.

Figure 2:
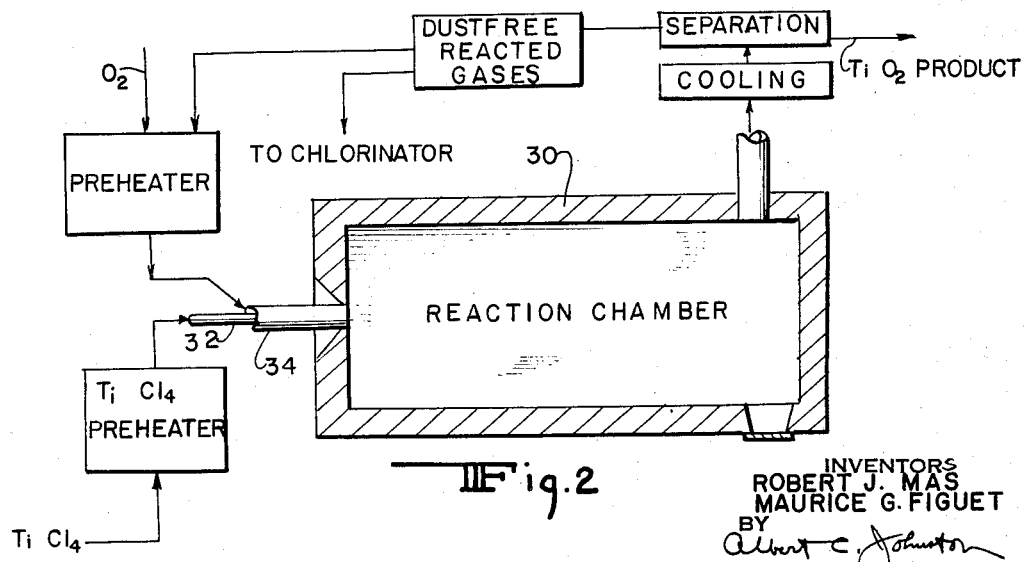

FIG. 2 is a diagrammatic view of a reaction chamber of a type suitable for reacting highly preheated streams of $TiCl_4$ vapor and oxygen. In accordance with British Patent No. 541,343, the reaction chamber 30 is provided with an assembly of at least two intake conduits 32 and 34 having concentric orifices for supplying the preheated gases into the reaction chamber, these conduits being connected respectively with suitable gas preheaters. The reaction products from chamber 30 flow through a cooling, separation and distribution system of the type referred to in connection with FIG. 1.

Example 1

(A) Into a reaction chamber of the type diagrammed in FIG. 1 there are introduced:

| | Flow rates | |
|---|---|---|
| | Kg./hour | M.³/hour at 0° C. and 760 mm. |
| (1) Through the central conduit 12, a mixture of: | | |
| (a) Vaporized $TiCl_4$ | 380 | 44.5 |
| (b) Oxygen | 67 | 47 |
| and | | |
| (c) Dust-free reacted gases containing— | | |
| Chlorine | 127 | 40 |
| Oxygen | 1.5 | 1 |
| and | | |
| Carbon dioxide | 12 | 6 |
| (2) Through annular conduit 14, carbon monoxide | 17 | 13.5 |
| and | | |
| (3) Through annular conduit 16, oxygen | 10 | 7 |
| Total inflow of gases | 614.5 | 159 |

The volume concentration of the $TiCl_4$ in the reaction zone amounts to $44.5/159 = 28\%$.

The products resulting from the reaction are passed from the reaction chamber through cooling apparatus and separation apparatus, yielding 160 kg. of $TiO_2$ per hour and separate dust-free reacted gases containing:

| | Kg./hour | M.³/hour |
|---|---|---|
| Chlorine | 411 | 129 |
| Oxygen | 4.5 | 3 |
| and | | |
| Carbon dioxide | 39 | 20 |
| Total dust-free reacted gases | 454.5 | 152 |

The concentration of chlorine in these gases amounts to $411/454.5 =$ approximately 90% by weight, and to $129/152 =$ approximately 85% by volume. Of the total production of these gases, 140.5 kg. per hour are recycled for admixture with the vaporized $TiCl_4$ and oxygen to be supplied to the reaction chamber. The remainder, amounting to approximately 314 kg. per hour, may be used for the chlorination of titaniferous raw material in the production of $TiCl_4$ to be consumed in the process.

(B) In the operation of the same production process with the use of nitrogen as the diluting gas, 59 kg. (47 cubic meters) per hour of nitrogen are mixed with the above-stated amounts of $TiCl_4$ vapors and oxygen to obtain in the reaction zone per hour 533 kg. or 159 cubic meters (basis: 0° C. and 760 mm. pressure) of reactant gases containing 380 kg. or 44.5 cubic meters of $TiCl_4$ at a volume concentration of 28%.

In this case the yield of $TiO_2$ is again 160 kg. per hour, but the composition of the dust-free reacted gases is:

| | Kg./hour | M.³/hour |
|---|---|---|
| Chlorine | 284 | 90 |
| Oxygen | 3 | 2 |
| Carbon dioxide | 27 | 13 |
| Nitrogen | 59 | 47 |
| Total dust-free reacted gases | 373 | 152 |

The concentration of chlorine in these gases amounts to approximately 76% by weight and approximately 59% by volume.

Thus, for the same dilution of the $TiCl_4$ in the combustion zone, the concentration of chlorine in the reacted gases is according to the invention 85% by volume, instead of 59%. Gases highly concentrated in chlorine are far more valuable for use in chlorination processes than gases of lower chlorine content.

Example 2

(A) Into a reaction chamber of the type diagrammed in FIG. 2 there are introduced in two streams separately preheated to a desired reaction temperature:

|  | Kg./hour | M.³/hour at 0° C. and 760 mm. |
|---|---|---|
| (1) Through central conduit 32, vaporized TiCl₄ | 380 | 44.5 |
| (2) Through annular conduit 34, a mixture of: | | |
| (a) Oxygen | 67 | 47 |
| and | | |
| (b) Dust-free reacted gases containing— | | |
| Chlorine | 143 | 45 |
| and | | |
| Oxygen | 2 | 1 |
| Total inflow of gases | 592 | 137.5 |

The volume concentration of the $TiCl_4$ in the reaction zone amounts to 44.5/137.5=32.5%.

The products resulting from the reaction are passed from the reaction chamber through cooling apparatus and separation apparatus, yielding 160 kg. of $TiO_2$ per hour and separate dust-free reacted gases containing:

|  | Kg./hour | M.³/hour |
|---|---|---|
| Chlorine | 428 | 135 |
| and | | |
| Oxygen | 4 | 3 |
| Total dust-free reacted gases | 432 | 138 |

The concentration of chlorine in the reacted gases amounts to approximately 99% by weight, or 98% by volume. Of the total production of these gases, 145 kg. per hour are recycled for admixture with oxygen for continuation of the reaction, and 287 kg. per hour may be used for chlorination.

(B) In the operation of the same production process with the use of nitrogen as the diluting gas, 59 kg. per hour of nitrogen (47 m.³/hour at 0° C. and 760 mm.) are mixed and preheated with the above-stated amount of vaporized $TiCl_4$, and the above-stated amount of oxygen is preheated and introduced alone into the reaction chamber. There results in the reaction zone per hour 506 kg. or 138.5 cubic meters (basis: 0° C. and 760 mm.) of reactant gases containing 380 kg. or 44.5 cubic meters of $TiCl_4$ at a volume concentration of 44.5/138.5=approximately 32%.

In this case the yield of $TiO_2$ is again 160 kg. per hour, but the composition of the dust-free reacted gases is:

|  | Kg./hour | M.³/hour at 0° C. and 760 mm. |
|---|---|---|
| Chlorine | 284 | 90 |
| Oxygen | 3 | 2 |
| Nitrogen | 59 | 47 |
| Total dust-free reacted gases | 346 | 139 |

The concentration of chlorine in these gases amounts to approximately 82% by weight, or approximately 65% by volume. Thus, the reacted gases are much less valuable for use in chlorinations than those obtained with a chlorine concentration of 98% by volume through the production of a like product with a like yield in accordance with the invention.

(C) In the operation of the same production process without any dilution of the reactant gases, the inflowing separate preheated streams of $TiCl_4$ vapor and oxygen provide in the reaction zone per hour 447 kg. or 91.5 cubic meters (basis: 0° C. and 760 mm.) of reacted gases containing 380 kg. or 44.5 cubic meters of $TiCl_4$ at a volume concentration of approximately 48.5%.

In this case the yield of $TiO_2$ is again the same, but the composition of the dust-free reacted gases is:

|  | Kg./hour | M.³/hour |
|---|---|---|
| Chlorine | 284 | 90 |
| Oxygen | 3 | 2 |
| Total dust-free reacted gases | 287 | 92 |

Since these gases contain approximately 99% by weight of chlorine, or 98% by volume on the basis stated, they are essentially the same in composition as the reacted gases obtained according to the invention in case A of this Example 2. In this case C, however, the volume concentration of the $TiCl_4$ in the reaction zone is 48.5%, while in case A of this example it is reduced to 32.5% and a $TiO_2$ product of much finer particle size is obtained without any reduction of the chlorine concentration of the reacted gases.

It will be evident that by increasing the amount of the reacted gases recycled for introduction into the reaction zone with the reactant gases, it is possible to increase the dilution of the $TiCl_4$ in the reaction zone to any desired extent, almost without limits, and at the same time to obtain reacted gases highly concentrated in chlorine for use in the chlorination processes. Once the process has been brought into steady continuous operation with any desired extent of dilution by recycled reacted gases, that fraction of the reacted gases which is not re-introduced into the reaction chamber will contain continuously an amount of chlorine approximately equal to the amount of chlorine contained in the $TiCl_4$ introduced into the reaction chamber.

The process according to the invention has the following advantages:

(1) The final concentration of chlorine in the reacted gases is not reduced by the use of a portion of the reacted gases for the dilution of the reactant gases; yet such use enables $TiO_2$ products of any of a wide variety of controlled particle sizes to be readily obtained and enables the entire fraction of the reacted gases that is not used for the dilution to be used effectively for the chlorination of titanium bearing ores or raw materials, without any necessity for providing special equipment or special steps to recover an excess of chlorine.

(2) The extent of dilution can be adjusted within wide limits without changing the amount of chlorine coming out of the process.

(3) For a given dilution, the final concentration of chlorine in the reacted gases may be regulated within certain limits by controlling the amount of reacted gases recycled according to the invention in relation to the total amount of gases used for dilution.

(4) For a final chlorine concentration given within certain limits, the dilution of the reactants in the reaction zone can be increased by increasing the amount of reacted gases recycled according to the invention and by introducing a suitable amount of other gases such as nitrogen or oxygen.

While the invention has been described with reference to particular examples and particular types of apparatus, it is to be understood that the particulars herein set forth are merely illustrative and that the invention is not limited to them in any way except as required by a fair construction of the appended claims.

We claim:

1. In a process for the preparation of titanium dioxide, in which reactant gases including vaporized titanium tetrachloride and oxygen are introduced continuously into a reaction zone and are reacted together therein at an elevated temperature to produce titanium dioxide and reacted gases including chlorine, the reaction products being passed continuously out of said zone and separated to obtain titanium dioxide and said reacted gases in substantially dust-free form, the improvement which comprises continuously mixing at least one of said reactant gases, before introducing it into said zone, with a recycled fraction of said dust-free reacted gases in an amount predetermined so as to give a desired dilution of the reactant gases entering said zone, thereby regulating the particle size of the titanium dioxide product and yet maintaining a high concentration of chlorine in the reacted gases, said recycled fraction amounting to between 0.2 and 2.0 kg. of said reacted gases per kg. of titanium tetrachloride introduced into said zone, said recycled fraction being premixed and introduced into said zone with at least one of said reactant gases in a gas stream that does not contain titanium tetrachloride at a temperature sufficient to cause reaction of titanium tetrachloride with oxygen.

2. In a process for the preparation of titanium dioxide, in which reactant gases including vaporized titanium tetrachloride and oxygen are introduced continuously into a reaction zone and are reacted together therein at an elevated temperature to produce titanium dioxide and reacted gases including chlorine, the reaction products being passed continuously out of said zone and separated to obtain titanium dioxide and said reacted gases in substantially dust-free form, the improvement which comprises continuously mixing at least one of said reactant gases, before introducing it into said zone, with a recycled fraction of said dust-free reacted gases in an amount predetermined so as to give a desired dilution of the reactant gases entering said zone, thereby regulating the particle size of the titanium dioxide product and yet maintaining a high concentration of chlorine in the reacted gases, said recycled fraction amounting to between 0.25 and 0.5 kg. of said reacted gases per kg. of titanium tetrachloride introduced into said zone, said recycled fraction being premixed and introduced into said zone with at least one of said reactant gases in a gas stream that does not contain titanium tetrachloride at a temperature sufficient to cause reaction of titanium tetrachloride with oxygen.

3. In a process for the production of titanium dioxide, in which a gaseous mixture containing vaporized titanium tetrachloride and oxygen is introduced continuously into a reaction zone and is reacted therein at an elevated temperature by contact with an auxiliary flame of carbon monoxide to produce titanium dioxide and reacted gases including chlorine, the reaction products being passed continuously out of said zone and separated to obtain titanium dioxide and said reacted gases in substantially dust-free form, the improvement which comprises continuously mixing a predetermined quantity of said dust-free reacted gases with said gaseous mixture before reaction of the latter and introducing the resulting mixture into said zone to maintain a desired dilution of said gaseous mixture therein, thereby regulating the particle size of the titanium dioxide product and yet maintaining a high concentration of chlorine in the reacted gases.

4. In a process for the preparation of titanium dioxide in which separate streams of vaporized titanium tetrachloride and oxygen containing gas, each preheated to an elevated temperature approximating that of the reaction, are introduced continuously into a reaction zone and reacted together therein at an elevated temperature to produce titanium dioxide and reacted gases including chlorine, the reaction products being passed continuously out of said zone and separated to obtain titanium dioxide and said reacted gases in substantially dust-free form, the improvement which comprises continuously introducing a predetermined quantity of said dust-free reacted gases into said zone in a gas stream other than said preheated stream of vaporized titanium tetrachloride, said quantity being selected to maintain a desired dilution of the reactants in said zone, and mixing all said streams together for the reaction in said zone, thereby regulating the particle size of the titanium dioxide product and yet maintaining a high concentration of chlorine in the reacted gases.

5. A process as defined by claim 4, said quantity of said dust-free reacted gases being introduced into said zone as a component of said preheated stream of oxygen containing gas.

6. A process for the preparation of titanium dioxide, in which reactant gases including vaporized titanium tetrachloride and oxygen are introduced continuously into a reaction zone and are reacted together therein at an elevated temperature to produce titanium dioxide and reacted gases including chlorine, the reaction products being passed continuously out of said zone and separated to obtain a titanium dioxide product and said reacted gases in substantially dust-free form, the improvement which comprises continuously recycling and introducing a fraction of said dust-free reacted gases into said zone so as to dilute the reactant gases entering said zone, the volume of said recycled fraction being selected to give a degree of dilution of said reactant gases corresponding to a desired particle size of the titanium dioxide product, varying said volume to effect a variation of said particle size when desired, and yet maintaining throughout the operations a substantially uniform high concentration of chlorine in the reacted gases, and continuously taking away from the process a remaining fraction of said reacted gases containing an amount of chlorine, at a concentration sufficiently high for direct use of the same for the production of titanium tetrachloride by the chlorination of titaniferous material, approximately equal to the chlorine content of the titanium tetrachloride continuously introduced into said zone, said recycled fraction being introduced into said zone in a gas stream that does not contain titanium tetrachloride at a temperature sufficient to cause reaction of titanium tetrachloride with oxygen.

References Cited in the file of this patent

UNITED STATES PATENTS

| 2,155,119 | Ebner | Apr. 18, 1939 |
| 2,340,610 | Muskat et al. | Feb. 1, 1944 |
| 2,779,662 | Frey | Jan. 29, 1957 |

FOREIGN PATENTS

| 541,343 | Great Britain | Nov. 24, 1941 |